United States Patent
Chishtie et al.

(10) Patent No.: US 9,311,229 B2
(45) Date of Patent: Apr. 12, 2016

(54) SYSTEM AND METHOD FOR MANAGING FLASH MEMORY

(75) Inventors: Suhaib Alam Chishtie, Brampton (CA); Puvikumar Sinnathamby, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 1066 days.

(21) Appl. No.: 13/074,431

(22) Filed: Mar. 29, 2011

(65) Prior Publication Data
US 2012/0254505 A1    Oct. 4, 2012

(51) Int. Cl.
*G06F 12/02*    (2006.01)

(52) U.S. Cl.
CPC .... *G06F 12/0246* (2013.01); *G06F 2212/1052* (2013.01); *G06F 2212/7202* (2013.01)

(58) Field of Classification Search
None
See application file for complete search history.

(56) References Cited

U.S. PATENT DOCUMENTS

| | | |
|---|---|---|
| 6,766,432 B2 | 7/2004 | Saltz |
| 7,308,549 B2 | 12/2007 | Kay et al. |
| 7,558,905 B2 | 7/2009 | Sinclair et al. |
| 7,590,794 B2 | 9/2009 | Sinclair et al. |
| 7,590,795 B2 | 9/2009 | Sinclair et al. |
| 7,610,437 B2 | 10/2009 | Sinclair et al. |
| 7,610,442 B2 | 10/2009 | Kim et al. |
| 7,774,392 B2 | 8/2010 | Lin |
| 7,814,262 B2 | 10/2010 | Sinclair |
| 8,055,832 B2 * | 11/2011 | Sinclair et al. ................ 711/103 |
| 2003/0221073 A1 | 11/2003 | Saltz |
| 2004/0162932 A1 * | 8/2004 | Mizushima et al. .......... 711/103 |
| 2004/0236897 A1 * | 11/2004 | Cheng ........................... 711/103 |
| 2005/0119987 A1 | 6/2005 | Kay et al. |

(Continued)

FOREIGN PATENT DOCUMENTS

| | | |
|---|---|---|
| WO | 2007019155 A1 | 2/2007 |
| WO | 2007019197 A2 | 2/2007 |
| WO | 2008082996 A1 | 7/2008 |

OTHER PUBLICATIONS

Chang, L.P., Kuo, T. W., "An Efficient Management Scheme for Large-Scale Flash-Memory Storage Systems", Department of Computer Science and Information Engineering, National Taiwan University, SAC '04, Mar. 1417, 2004, Nicosia, Cyprus, copyright 2004.

(Continued)

*Primary Examiner* — Mark Giardino, Jr.
*Assistant Examiner* — Tasnima Matin
(74) *Attorney, Agent, or Firm* — Rowand LLP

(57) ABSTRACT

A system and method for flash memory management is provided. In particular, the system and methods herein provide for management of flash memory, particularly NAND flash memory, in a manner that potentially reduces the number of write/erase cycles typically experienced by a data storage device. When unsecure data records are to be written to the flash memory, the new or updated unsecure data records are stored in the first available location in the flash memory (e.g. a block) providing a best fit for the data records. Where the data records are updates, the updated version is stored with an incremented version number to indicate that the updated version is the current version. Older versions of the data records are deleted during garbage collection. When secure data records are to be written to the flash memory, new or updated secure data records are stored in the location in the flash memory with the most available space. Any older versions of secure data records are immediately deleted.

23 Claims, 8 Drawing Sheets

(56) References Cited

U.S. PATENT DOCUMENTS

| | | |
|---|---|---|
| 2006/0101439 A1 | 5/2006 | Massarenti et al. |
| 2006/0184718 A1 | 8/2006 | Sinclair et al. |
| 2006/0184723 A1 | 8/2006 | Sinclair et al. |
| 2007/0043789 A1* | 2/2007 | Cannon et al. ................ 707/203 |
| 2007/0045425 A1* | 3/2007 | Yoshida et al. ............... 235/492 |
| 2007/0088904 A1 | 4/2007 | Sinclair |
| 2008/0244211 A1* | 10/2008 | Ito ................................. 711/170 |
| 2009/0164709 A1* | 6/2009 | Lee et al. ....................... 711/103 |
| 2009/0271562 A1* | 10/2009 | Sinclair ......................... 711/103 |
| 2009/0271563 A1* | 10/2009 | Gopalan et al. ............... 711/103 |
| 2009/0319720 A1 | 12/2009 | Stefanus et al. |
| 2009/0327372 A1 | 12/2009 | Ylonen |
| 2010/0017650 A1 | 1/2010 | Chin et al. |
| 2010/0161884 A1* | 6/2010 | Kurashige ..................... 711/103 |
| 2010/0223423 A1 | 9/2010 | Sinclair et al. |
| 2010/0235831 A1* | 9/2010 | Dittmer ............................ 718/1 |
| 2010/0250839 A1 | 9/2010 | Ito et al. |
| 2010/0250840 A1* | 9/2010 | Wong ............................ 711/103 |
| 2011/0154060 A1* | 6/2011 | Guyot et al. .................. 713/193 |

OTHER PUBLICATIONS

Filip P. et al., "Schism: Fragmentation-Tolerant Real-Time Garbage Collection", Department of Computer Science, Purdue University, PLDI'10 Jun. 5-10, Toronto, Ontario, Canada, copyright 2010.

\* cited by examiner

SYSTEM AND METHOD FOR MANAGING FLASH MEMORY

BACKGROUND

1. Technical Field

The present application relates generally to a system and method for managing flash memory such as NAND memory.

2. Description of the Related Art

Flash memory (such as NOR and NAND flash memory) is a useful form of non-volatile primary or secondary data storage for use in compact data storage and processing devices, such as solid-state drives, memory keys, and mobile computing and/or communication devices such as tablet computers and smartphones. Given the typical configuration of flash memory, while the memory might be written to or read in a random-access fashion (particularly in the case of NOR flash) or on a per-page basis (for NAND flash), flash memory typically can only be erased one block at a time. Thus, data written to the memory often cannot be rewritten without erasing at least an entire block. While blocks may be quickly erased, during the course of normal use in computing and communication devices, flash memory is subject to a large volume of write and erase cycles which, eventually, degrades the performance of the memory.

BRIEF DESCRIPTION OF THE DRAWINGS

In drawings which illustrate by way of example only embodiments of the present application.

DETAILED DESCRIPTION

Figure 1:
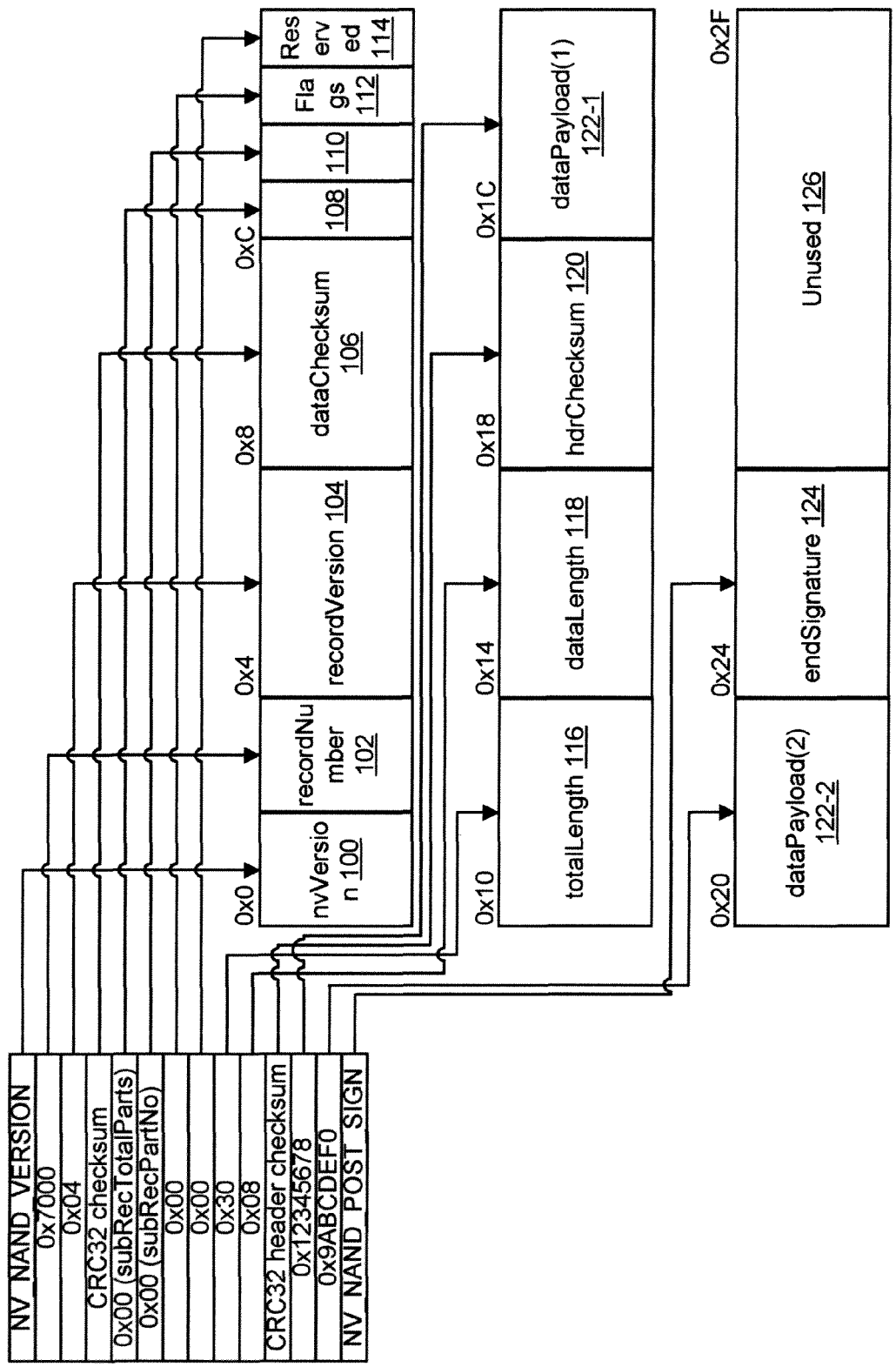
FIG. 1 is a schematic diagram illustrating a data record structure for use in flash memory.

The within embodiments thus provide a system and method for managing flash memory, i.e., non-volatile computer storage devices adapted to be electrically programmed and erased, that provide improved rewrite execution time and potentially reduce wear and tear on the flash memory.

There is provided a method of managing flash memory, the method comprising writing an unsecure data record to a first block of said flash memory, said first block being selected as having a best fit for said unsecure data record; and writing a secure data record to a second block of said flash memory, said second block being selected as having a maximum available space for receiving a data record.

In one aspect, writing said unsecure data record comprises determining that said unsecure data record is a further version of a previous unsecure data record stored in the flash memory, and writing said unsecure data record with a record version value incremented from a record version value of said previous unsecure data record.

In another aspect, writing the secure data record comprises determining that said secure data record is a further version of a previous secure data record stored in another block of the flash memory; writing said secure data record with a record version value incremented from a record version value of said previous secure data record; moving any data records comprised in said other block, other than the previous secure data record, that are not marked for deletion; and erasing said other block.

In a further aspect, the first block comprises a smallest amount of available space for storage of said unsecure data record for all blocks within said flash memory. Further, the second block may comprise a largest amount of available space for storage of said secure data record for all blocks within said flash memory.

In still another aspect, the method further comprises deleting said unsecure data record by writing a further version of said unsecure data record to a further block being selected as having a best fit for said unsecure data record, said further version being marked for deletion.

In other aspects, the further version of the unsecure data record is marked for deletion through an indication of a data length of zero. In the within embodiments, the method may further comprise, for each data record in a block of a flash memory, determining whether said data record comprises a version number that is the same as an active version number stored for said data record; if so, copying said data record to a further block of said flash memory; and erasing said block of flash memory.

In another aspect, the further block is determined to provide a best fit for said data record.

The embodiments described herein also provide a data storage device, comprising: flash memory; and a processor configured to enable: writing an unsecure data record to a first block of said flash memory, said first block being selected as having a best fit for said unsecure data record; and writing a secure data record to a second block of said flash memory, said second block being selected as having a maximum available space for receiving a data record.

In one aspect of the data storage device, the processor is further configured to determine that said unsecure data record is a further version of a previous unsecure data record stored in the flash memory, and to write said unsecure data record with a record version value incremented from a record version value of said previous unsecure data record.

In another aspect, the processor is further configured to write said secure data record by: determining that said secure data record is a further version of a previous secure data record stored in another block of the flash memory; writing said secure data record with a record version value incremented from a record version value of said previous secure data record; moving any data records comprised in said other block, other than the previous secure data record, that are not marked for deletion; and erasing said other block.

In a further aspect of the data storage device, the first block comprises a smallest amount of available space for storage of said unsecure data record for all blocks within said flash memory. Further, the second block may comprise a largest amount of available space for storage of said secure data record for all blocks within said flash memory.

In still another aspect of the data storage device, the processor is further configured to delete said unsecure data record by writing a further version of said unsecure data record to a further block being selected as having a best fit for said unsecure data record, said further version being marked for deletion. Additionally, the further version may be marked for deletion through an indication of a data length of zero.

In yet another aspect, the processor is further configured to: for each data record in a block of a flash memory, determine whether said data record comprises a version number that is the same as an active version number stored for said data record; if so, copy said data record to a further block of said flash memory; and erasing said block of flash memory. Further, the further block may be determined to provide a best fit for said data record.

In a further aspect of the within embodiments, the flash memory may comprise NAND flash memory.

There is also provided a computer program product comprising a computer-readable medium, which may be non-transitory, storing or bearing code which, when executed by at least a processor of a data storage device, configures said data storage device to carry out the methods and processes described herein, and in particular to write an unsecure data record to a first block of said flash memory, said first block being selected as having a best fit for said unsecure data record; and write a secure data record to a second block of said flash memory, said second block being selected as having a maximum available space for receiving a data record.

These embodiments will be described and illustrated primarily in relation to NAND memory, and specifically a system in which NAND storage is managed using a flash memory file system. However, it will be appreciated by those skilled in the art that these embodiments may be implemented in respect of any flash memory or other electronically erasable and programmable memory, particular those types and formats of memory that are block-erasable and permit page-based or sector-based writing, or even random-access writing, although not necessarily page-based, sector-based, or random-access based erasure or rewriting. NAND flash memory is selected herein for its advantageous, comparatively dense memory cell structure, and for its current popularity in mobile and other computing and communication devices. Flash memory, and in particular NAND storage, may be embedded within the computing or communication device (e.g., a motherboard) itself and be non-removable. It may also be provided in the form of a removable chip or card, such as in a MultiMediaCard (MMC) format or Secure Digital (SD) format, which are formats defined by or maintained by the JEDEC Solid State Technology Association, Arlington, Va. 22201-2107 and the SD Card Association, San Ramon, Calif. 94583, respectively. The flash memory herein may be provided in accordance with related predecessor and successor formats or variants such as micro formats (e.g. MMCmicro and microSD).

It will further be appreciated by those skilled in the art that while the embodiments herein are described in the context of a file system configured to manage flash memory (and particularly NAND) storage, these embodiments are not necessarily restricted specifically to NAND storage or to a file system as it may be implemented in an operating system. For example, flash memory storage may alternatively be managed by a controller integrated within an application-specific integrated circuit or within a device processor, or by a separate controller circuit in communication with a device processor. A controller may be configured to implement the method and system described herein.

The construction, I/O bus configuration, commands or control signals, and addressing relevant to flash memory, and particularly NAND flash memory, will be known to those skilled in the art. Further, those skilled in the art will further appreciate that the NAND flash memory may be provided in a variety of sizes, with varying total capacity, block and page size. For example, NAND memory may be provided with block sizes of 16, 128, 256 or 512 KB, with 32, 64, 64 or 128 pages, respectively. Each page of NAND flash memory typically includes a small amount of overhead reserved for an error correcting code (ECC) checksum. Thus, for example, a single 2 GB NAND flash memory device can include 2048 blocks, each block comprising 64 pages, each page having 2048 bytes with an additional 64 bytes of overhead for ECC or other purposes.

In sector-based or paged-based flash memory, such as NAND flash memory, data may be written to clean (i.e., empty or erased) pages of a given block. Typically pages within a given block are written in sequential order, and if data (which may be in the form of records) is to be changed within a given page, the entire page must be written to a new, clean ("good") page, and the previously written page marked as dirty. Additional data typically cannot be added to an already written page. Thus, eventually any given block in NAND flash memory may eventually comprise a collection of both good and dirty pages. Since NAND flash can only be deleted on a block-by-block basis, to delete an existing record on a given block, any other records stored within that block must be written to a new block, then the original block erased. To update an existing record with new data, then the updated record with the new data must be written to a new block, any other records stored within that block must be written to a new block, then the original block again erased.

Similarly, when memory capacity is low because of the prevalence of good and dirty pages (which are not clean and available to receive new data), a garbage collection routine must be invoked to "pack" the blocks to remove dirty pages, and consolidate records on clean pages. During garbage collection, good pages are rewritten to a new location (e.g., a clean block), and then the original block, with its original good pages and dirty pages, is erased. This garbage collection may be carried out on a periodic basis, or when it is determined that records stored in the NAND flash memory must be packed to provide more space for storing additional data.

As will be well understood by those skilled in the art, even solid state storage media—such as flash memory—can only endure a finite number of write-erase (or program-erase) cycles before the wear and tear on the memory device deteriorates the integrity of the memory. Because of the density of storage win a NAND flash memory device in particular, the memory may still provide ample and suitable storage even if bad blocks develop as a result of normal wear and tear; indeed, NAND flash memory may already have some bad blocks as a result of the manufacturing process. A NAND flash memory controller or file system may perform some wear-levelling—i.e. distribution of data in an attempt to equalize the number of write or erase cycles endured by each block—however, reducing the number of necessary write or erase cycles would also be beneficial in maintaining the useable life of the memory. Reducing the number of write and erase cycles may also improve execution time when the computing or communication device carries out an instruction to write, update or clear records in the NAND flash memory.

Thus, in accordance with one embodiment, records may be laid out in the NAND flash memory as depicted in FIG. 1 and in the table below. Each record generally comprises header information and a payload. The header information is used to manage the records stored in the flash memory, while the payload comprises the data to be stored, which may be intended for use by applications, functions, or other modules executing on the computing or communication device. In the example of FIG. 1, a typical record in NAND flash memory may include:

TABLE 1

| Record Element | Location | Brief Description |
| --- | --- | --- |
| nvVersion 100 | header | file system version number |
| recordNumber 102 | header | record identifier |
| recordVersion 104 | header | record version number |
| dataChecksum 106 | header | checksum computed from payload |
| subRecTotalParts 108 | header | identifies number of sub-records for record |
| subRecPartNo 110 | header | identifies sub-record number if applicable |
| flags 112 | header | used to indicate whether record is secure |
| reserved 114 | header | may be reserved for future use |
| totalLength 116 | header | total length of record or sub-record |
| dataLength 118 | header | length of data within record or sub-record |
| hdrChecksum 120 | header | checksum for preceding header elements |
| dataPayload(1) 122-1 and dataPayload(2) 122-2 | payload | data payload, if any |
| endSignature 124 | signature | signature DWORD |

As indicated in Table 1 above, the header of a given record may include a version number for the file system supported by the NAND flash memory layout (nvVersion 100); a recordNumber 102 identifying the record by an identifier value; a recordVersion 104, which as explained below is used to track whether the record is the current version of the record; and a dataChecksum 106, which is a checksum or other verification code value computed from the payload (dataPayload(1) and (2)) 122-1 and 122-2, such as a CRC32 checksum. In the example of FIG. 1, a typical layout of a record number 0x7000 (i.e., recordNumber 102=0x7000) is shown, with a recordVersion 104 of 0x04. It will be appreciated by those skilled in the art, of course, that the selection of names or labels such as those given in Table 1 and FIG. 1 are not mandatory, and other suitable names or labels may be used for these record elements. Further, it will be appreciated that the various elements need not be presented in the precise order illustrated herein, and that some elements may indeed be omitted, or other elements not described herein added.

A single record may span multiple pages in a single block. Further, in this example, the record may in fact be a sub-record, in that it comprises only a portion of a single record that spans multiple blocks. Thus, the header values subRecTotalParts 108 and subRecPartNo 110 are used to identify the individual sub-record as part of a series of sub-records. The first value, subRecTotalParts 108, identifies the total number of sub-records for the single record. The second value, subRecPartNo 110, identifies this sub-record's sequence within the set of sub-records. Each sub-record within a set, however, is assigned the same recordNumber 102 and recordVersion 104. The file system may impose a maximum on the number of multiple-block records and the maximum number of sub-records per multiple-block record that may be stored in the NAND flash memory, since a large number of multiple-block records of course restricts the amount of available storage space for other records and for garbage collection. In the example of FIG. 1, the record is presumed to be a stand-alone record (i.e., not a sub-record), so the subRecTotalParts value 108 and the subRecPartNo 110 are both zero (0x00).

Other flags or data may be maintained in the record header. The flag values 112 may be used to indicate whether the record comprises secure data or not, as explained below. In the example of FIG. 1, this value is again set to zero (0x00) which may indicate in this embodiment that it is not a secure record. Other space may be reserved in the record header for other data 114.

The header may also include values representing the totalLength 116 of the record, indicating the total space occupied by the record, including the header, and the dataLength 118, indicating the total space occupied by the payload portion of the record (if the record is actually a sub-record, then the dataLength 118 represents only the payload length of the sub-record). In this example, a totalLength of 30 bytes (0x30) and a dataLength of 8 bytes (0x08) is indicated in FIG. 1.

Finally, the header in this example terminates with a header checksum value, hdrChecksum 120, which may be a CRC32 checksum or other signature value computed from the contents of some or all of the header, in this case all content from nvVersion 100 to dataLength 118, although it will be appreciated that it is not necessary to include all header elements in the checksum.

The header is followed by the payload portion of the record, here represented by dataPayload(1) 122-1 and dataPayload(2) 122-2. In this example, two payload portions, each a DWORD (4 bytes in length) are provided with values of 0x12345678 and 0x9ABCDEF0 respectively. The payload portion of the record may include additional words or data in other units.

The payload in this example is then followed by a record signature, endSignature 124, which may be an additional DWORD signalling the end of the record comprising a value that can be used to quickly check the integrity of the record without verifying the data payload. The signature may be a selection of values identifying offsets or values within the record, such as the number of DWORDS comprised in the payload.

Figure 2:
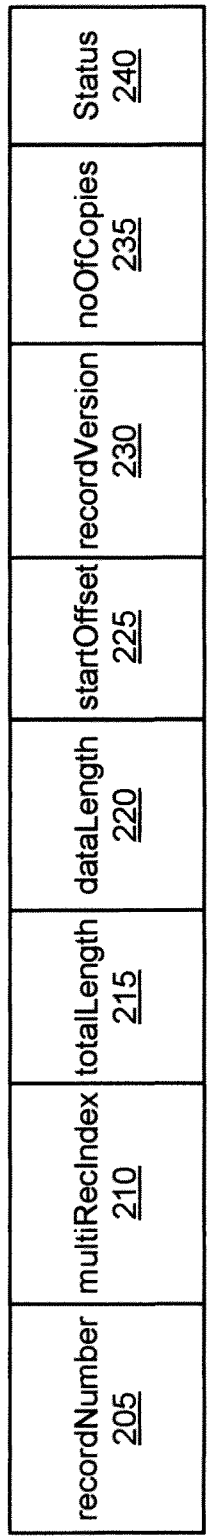
FIG. 2 is a schematic diagram illustrating an array record for the data record structure of FIG. 1.

Records are tracked in the file system using a table, such as a hash table, which may be maintained in volatile memory while the operating system of the computing or communication device is executing. An example of the structure of a record in a hash table or array 200 is illustrated in FIG. 2. A given record 200 within the array includes some information that may also be included in the header of the data record itself as stored in the NAND flash memory, and a single entry or record 200 within the array corresponds to a single record, which may be a multiple-block record as described above. For example, the array record 200 can include the recordNumber 205, although to reduce the array size, each record in the array may be indexed by a hash of the recordNumber 102; thus, the recordNumber 205 may be a hash value. The array record can also include an indicator whether the corresponding data record is a multiple-block record. If it is, the value multiRecIndex 210 may be included, and would then comprise an index to another table or array described below. If the corresponding data record is not a multiple-block record, then the multiRecIndex 210 may be non-existent, have a null value, or some other invalid value.

The array record 200 also includes a dataLength value 220, indicating the total length of the payload of the record (similar to the dataLength 118 of FIG. 1); in the case of a multiple-block record, the dataLength value 220 may be the total payload length for the complete record. In the case of a deleted record, as will be described below, the dataLength value 220 may be recorded as zero.

The array record 200 also includes a startOffset value 225, indicating the offset of the data record from the start of the flash memory; for a multiple-block record, this value is set to −1 (i.e., the value may be ignored or set to an invalid value, since the array record includes an index (multiRecIndex 210) to a further multidimensional array defining the multiple-block record). recordVersion 230 comprises a value indicating the current active version for the data record, and noOfCopies 235 indicates the total number of copies of the record currently present in the flash memory; since, as described below, new copies of records are written when the data is to be updated, for example, multiple copies of a given record may exist at a given time, although only one of those copies is intended to be the current active version. Generally, the version of the data record having the latest version number (recordVersion 104 in FIG. 1) is considered to be the active version.

The array record 200 may also include flags or other status values 240 to indicate a status of the data record, such as whether the record comprises secure data (similar to the flags 112 of FIG. 1). Again, as with the structure of the data record of FIG. 1, it will be appreciated by those skilled in the art that additional, or different, elements may be included within the array record 200, and that the existing elements described in FIG. 2 may be provided with different names, labels, or values.

Figure 3:
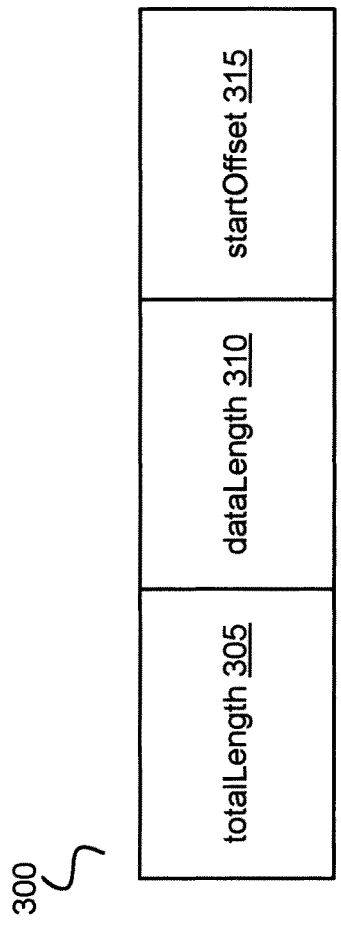
FIG. 3 is a schematic diagram illustrating a further array record in a multidimensional array for a multiple-block data record generally implementing the data record structure of FIG. 1.

FIG. 3 illustrates an exemplary layout of an entry 300 in a multiple-block record array for tracking multiple-block records. As mentioned above, each array record 200 for a multiple-block record includes an index to a further multidimensional array; the index for this array record 300 is not shown in FIG. 3. For each multiple-block data record, there will be provided an array record 300 for each one of the sub-records comprised in the data record; FIG. 3 illustrates one such array record 300. For a given sub-record, then, the array record 300 comprises at least a totalLength value 305, indicating the total space occupied by the sub-record, including header; a dataLength 310 value, comprising a value representing the total space occupied by the payload of the sub-record; and a startOffset value 315, indicating the physical address of the sub-record is located in the flash memory module. When a multiple-block record is erased from memory, the associated entry in the record tracking table will be deleted along with the multiple-block record array associated with the multiple-block record. The hash table or array and its records 200, and the further multidimensional arrays for each multiple-block record and their records 300, may be constructed during an initialization routine and maintained in volatile memory.

As mentioned above, the data comprised in records such as those illustrated in FIG. 1 may be flagged as "secure". Secure data may include confidential or personal information, such as user authentication credentials (passwords, personal identification numbers, certificates, and the like), data designated as private or confidential by a user of the communication or computing device, or data designated as such through an information technology policy or administrator setting either configured at the communication or computing device, or else configured remotely in a policy setting file and transmitted to the communication or computing device. Other data that is not thus flagged may therefore be considered to be "unsecure", and a data record comprising an unsecure record may be considered to be an unsecure or "regular" record.

Figures 4, 5:
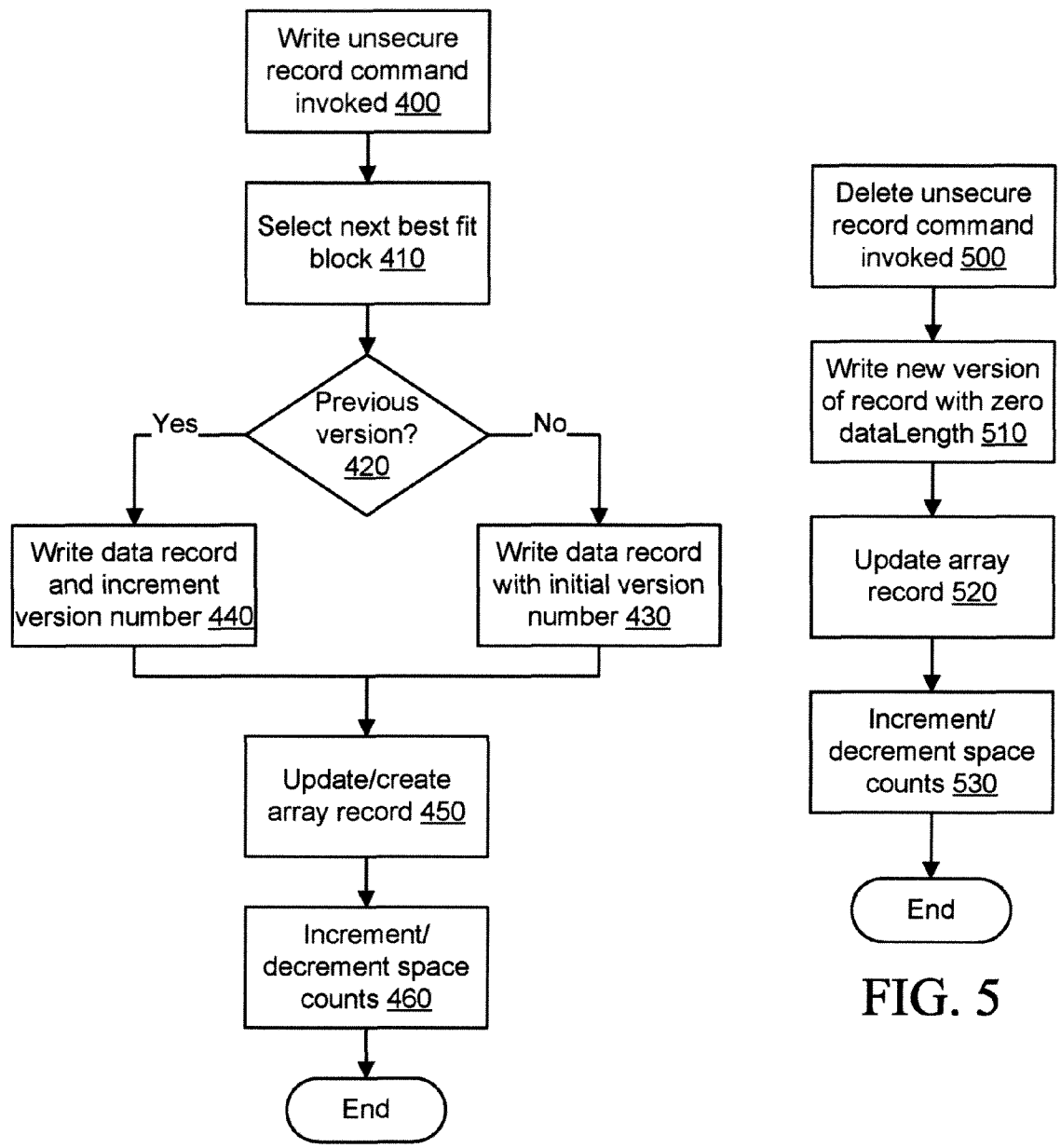
FIG. 4 is a flowchart illustrating a process for writing an unsecure data record to flash memory.
FIG. 5 is a flowchart illustrating a process for deleting an unsecure data record in flash memory.

When a record comprising unsecure data—i.e., a regular record—is to be written to flash memory (e.g., NAND flash memory), a process such as that illustrated in FIG. 4 may be implemented. A write command is invoked at 400, requesting that an unsecure record be written to the flash memory. At 410, the next available "best fit" block is located for the record.

As used herein, a "best fit" block is a block in the flash memory that not only has sufficient available space to store a given data record, but also has an amount of available space that is closest to the size of the data record to be stored; in other words, the best fit block is that block with the smallest amount of available capacity to store the data record. If there is more than one block that has the best fit for a data record, then the first available block within the flash memory may be selected, or else some other rule may be used to determine which of a plurality of best fit blocks is selected for the data record, such as selecting the potential best fit block with the fewest records, or the potential best fit block with the fewest secure records.

To determine the available capacity of a block the file system may maintain a count (stored in an array in volatile memory for example) of recoverable and available space for each block. The total amount of available space for a given block is the capacity provided by the clean pages at the end of the block; the total amount of recoverable space is the amount of space occupied by dirty pages with superseded or deleted data records written to them that could be recovered if the current versions of records in the block were packed, with multiple records to a page. These counts may be updated as new data records or updated data records are written to the flash memory, and as existing data records are deleted from the flash memory.

Once the best fit block is located, at 420 it is determined whether a previous version of the record was previously stored in the flash memory. This can be determined by indexing into the hash table or array, using a record number for the regular record to be written, to determine whether a previous record 200 exists for that regular record. If no previous record exists, then the record will be a new record; it is therefore written to a clean page in the flash memory at 430. A new array record 200 is created for the newly-written record with the information described above at 450. The version number (recordVersion 104) for the newly-written record will be assigned an initial value, which may be, for example, 0 or 1. This record version value will be written to the array record 200 (as recordVersion 230) for the newly-written record. Next, counts of the total available space and/or total recoverable space for the affected blocks are updated at 460. If the record is a multiple-block record, then the effect on total available and total recoverable space will impact multiple blocks.

At decision block 420, a previous version of the data record may be determined to exist. This determination may be made by locating an existing array record 200 for the data record referencing the same record number (recordNumber 102). This array record 200 will include a recordVersion 230 value, which may be the initial value (if the data record was previously only newly-written) or a greater value (if there had been multiple earlier versions of the data record). Thus, the data record to be written in response to the command 400 is an updated record. As with the newly-written record, at 440 the updated record is written to the identified best fit location in the flash memory, with a recordVersion 104 value incremented from the recordVersion 230 value found in the existing array record 200 to the next version number. In addition, the recordVersion 230 value in the existing array record 230 is incremented as well to reflect the new recordVersion 104 value at 450. Further, the total available space and total recoverable space counts for the affected blocks are updated at 460. Again, if the updated record is a multiple-block record, the impact on total available and recoverable space will span multiple blocks, since the previous version of the data record may have spanned multiple blocks, and the sub-records stored on those blocks are now effectively flagged for deletion. From the foregoing, it will be noted that the previous version of the data record still remains on another page within the flash memory; however, its recordVersion 104 value is no longer the active version value. The existing array record 200 is also updated to reflect other changed characteristics of the unsecure data record, such as offset (startOffset 225) and number of copies (noOfCopies 235). It will of course be appreciated by those skilled in the art that whenever a data record is updated or moved as described herein, the header of the data record itself will further be updated as necessary, which can include the header checksum (hdrChecksum 12), as well as other portions of the data record such as the end-Signature 124.

If an instruction is received to delete an unsecure data record, as illustrated in FIG. 5 at block 500, an updated version of the data record is written in a manner similar to that illustrated in FIG. 4 for those cases where a previous version of the data record exists (i.e., the branch following block 440). The recordVersion 104 value of the updated data record is updated with an incremented version value when the new version of the data record is written to a best fit block at 510, as before, and the array record 200 corresponding to the data record is likewise updated with the new version value at 520. The total available and total recoverable space counts are also updated at 530. However, in updating the data record, the dataLength 118 of the data record is set to zero, indicating that the data record is flagged for deletion. The dataLength 220 in the array record 200 is likewise set to zero. Optionally, when the updated data record is written, the payload 122-1, 122-2 may also be set to null. It will be appreciated by those skilled in the art that data records thus deleted may still be accessed in the flash memory, but are considered by the system and method described herein to be outdated and/or obsolete. The previous versions of unsecure data records may be subsequently deleted by a garbage collection process, described below.

By writing the new or updated data records to a best fit block (and by deleting data records by a similar process), the space within the flash memory is more efficiently used, since this process may reduce the number of blocks with single clean pages left as the flash memory starts filling up with records through normal use. The best fit process provides for an amount of block packing on the fly, so to speak, as new and updated data records are written to the smallest blank area providing sufficient space, rather than simply being written to any first available page or block. As a result, the flash memory may be able to store more records before it is deemed necessary to invoke a garbage collection routine to recover storage space in the flash memory.

Figures 6, 7:
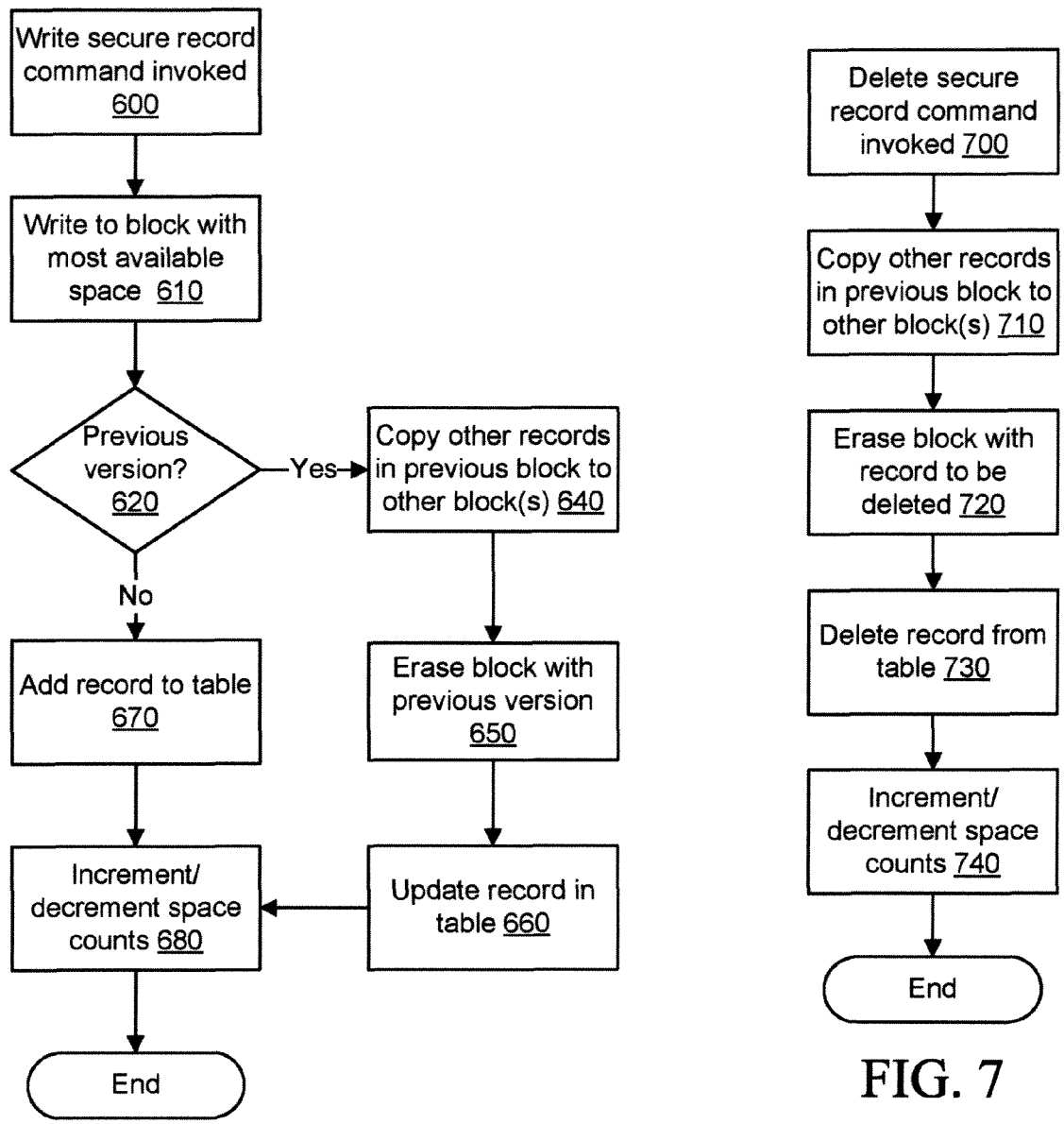
FIG. 6 is a flowchart illustrating a process for writing a secure data record to flash memory.
FIG. 7 is a flowchart illustrating a process for deleting a secure data record in flash memory.

Data records comprising secure data may be handled differently to preserve the security or privacy of that data. Turning to FIG. 6, an exemplary method for writing a secure record to a flash memory is shown. At 600, a write command is invoked, requesting that a secure data record be written to the flash memory. A determination is made which block has the most available space, in contrast to the above process for writing an unsecure data record, in which the best fit block was located. Because secure data records are erased from the flash memory every time they are updated or whenever such a record is to be deleted (rather than simply flagging the record for deletion), it will be necessary to move any other data records from the previous block each time a secure data record is to be updated or deleted in order to complete the block erasure; thus, storing the secure data record in a block with the fewest number of existing data records may later reduce the number of records that must be moved. At 610, the secure data record is written to the identified block. At 620, it is determined whether the secure data record had a previous version; this may be determined generally as described above with respect to an unsecure data record. If so, the previous version is erased following the process represented by branch 640. Unlike older unsecure data records, secure data records are deleted immediately after updating to mitigate the possibility that obsolete, but still confidential, data can be retrieved from the flash memory.

Thus, at 640, any other data records—specifically, those data records that are not flagged for deletion (for example because they have their data length value set to zero)—that are present in the same block as the previous secure data record are copied to other blocks. The other blocks may be selected using the best fit approach if an unsecure record is being moved, as described above, and by selecting the block with the maximum available space if a secure record is being moved. However, because the data records are simply being moved and not updated, their recordVersion values are not incremented as described above in the case of an unsecure record that is updated; rather, the other values of the data record (e.g. the header and endSignature 124) and of the array record 200 are updated as necessary to reflect the new location of the data record. Once all data records to be moved have been moved, the block storing the previous version of the secure data record is erased at 650. The array record 200 corresponding to the secure data record is also updated at 660 as necessary. Finally, the total available and total recoverable space counts that are maintained by the file system for the individual blocks are updated at 680, then the process ends.

When a secure data record is to be deleted in response to a command 700, as illustrated in FIG. 7, a process similar to that described in branch 640 of FIG. 6 is carried out. The block containing the secure data record must be erased; accordingly, at 710, any other data records stored in that block are identified and moved to another block or blocks as described above. The block is erased at 720, and the array record 200 corresponding to that secure data record is deleted at 730. Finally, the total available and total recoverable space counts for each of the impacted blocks are updated at 740.

Figure 8:
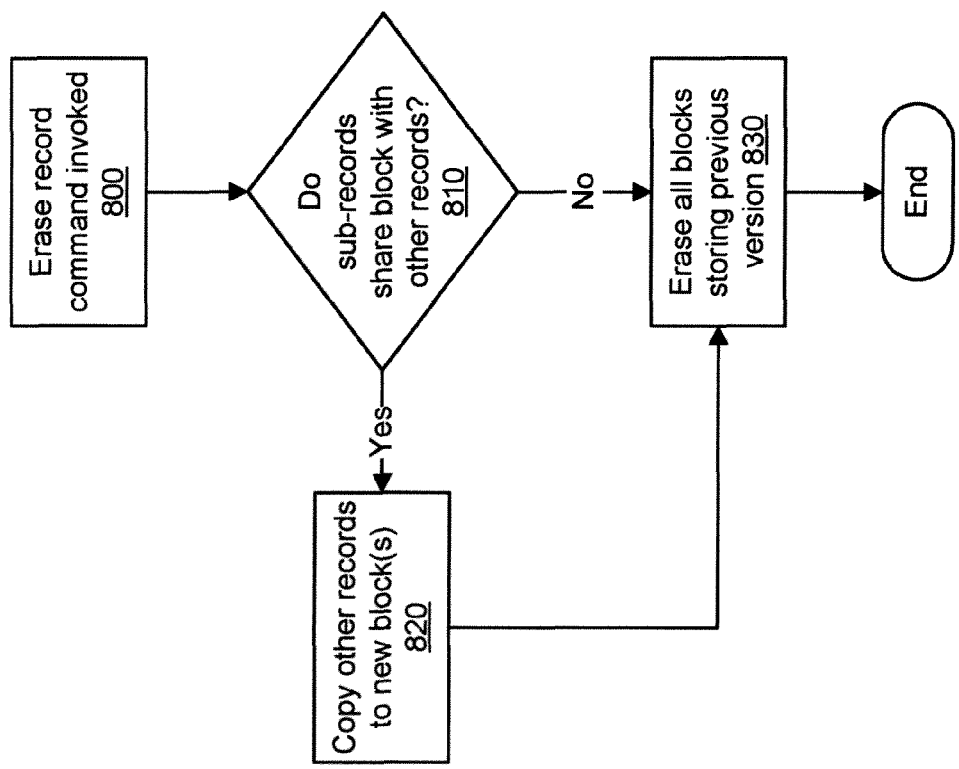
FIG. 8 is a flowchart illustrating a process for implementation in deleting a multiple-block record from flash memory.

When a data record comprising multiple sub-records is to be erased from multiple blocks—as may occur when a previous version of a secure data record is to be erased, or when garbage collection is carried out to remove data records marked for deletion, for example—a process such as that illustrated in FIG. 8 may be followed. When an erase command is invoked at 800, it is determined whether the blocks storing the sub-records of the multiple-block data record also store other records at 810. If not, then the block bearing only that sub-record may be erased (and the hash table or array, and further array corresponding to that multiple-block data record, may be updated as necessary). If the block also stores other data records, then those other data records are moved to new blocks at 820 generally as described above in the context of writing an updated unsecure or secure record, with the exception that the version of the data record is not updated, although other header values or parameters of the moved data record may be updated. Once the other data records have been moved, the blocks storing the previous versions of those moved records and the sub-records may be erased at 830.

As unsecure data records are updated, the number of previous versions of the data records stored in the flash memory will continue to increase and persist in the memory until the block on which they are stored is erased. Since the foregoing processes for managing unsecure data records reduce the number of erase cycles when simply updating the unsecure data record, it will be appreciated by those skilled in the art that the number of dirty, unusable pages will grow. Accordingly, periodically a garbage collection routine is implemented to pack the blocks in the flash memory and to erase those data records that are no longer needed. While the garbage collection routine can be executed at predefined intervals or upon certain triggering events—for example, on a daily basis, upon bootup or restart of the computing or communication device, or upon shutdown—it may also be triggered by a determination that a given block's total available space is less than, or less than or equal to, the total amount of recoverable space. As noted above, the counts of available and recoverable space are maintained by the file system; whenever it is determined that this condition is true for a block, the block with the most recoverable space is packed using a garbage collection routine. Once that block is packed, the process may move on to determine a next block with the next largest amount of recoverable space, and continue the process until all blocks for which the amount of recoverable space exceeded the amount of available space.

Figure 9:
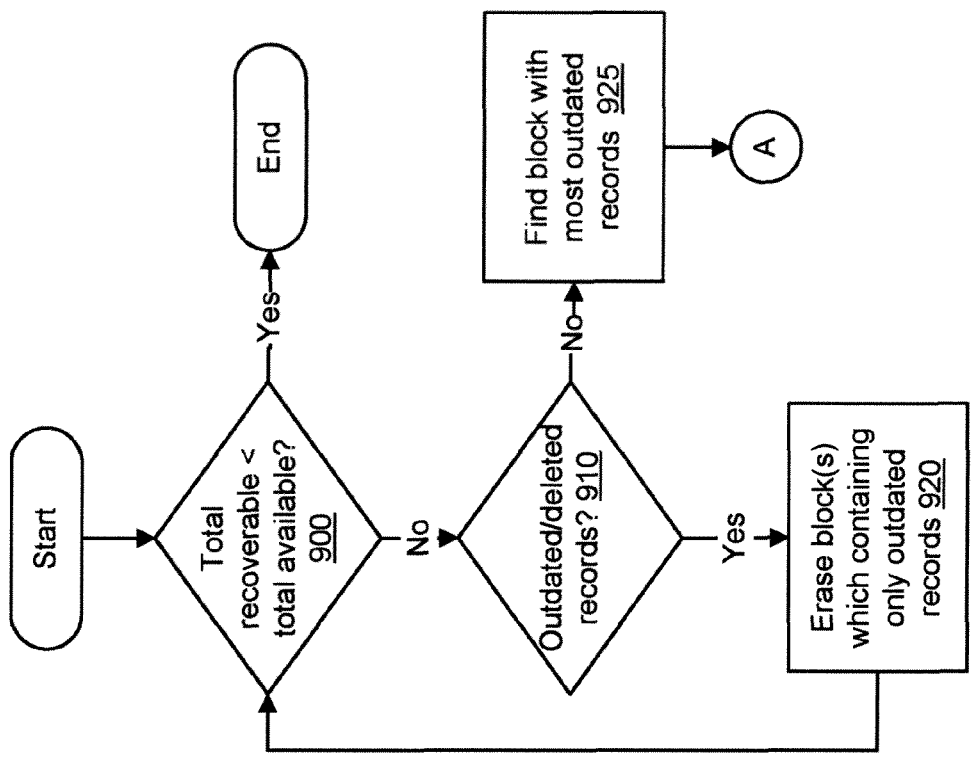
FIG. 9 is a flowchart illustrating a process for implementation with a garbage collection routine.

More generally, the garbage collection process may be initiated when it is determined that the total recoverable space across all blocks of the flash memory exceeds or is equal to the total amount of available space across all blocks. This type of determination is illustrated in FIG. 9. At 900, the amount of total recoverable space from packing all blocks is compared with the total available space available. If it is less than the total available space, then the process ends. If it is the same or greater, then a block packing process is initiated (as noted above, this determination may be made on a block-by-block basis rather than by evaluating a sum of all recoverable and available space).

At 910, it is determined whether there are blocks comprising only outdated or deleted (i.e., flagged for deletion) data records, as indicated by those array records having a dataLength of zero. (It will be understood by those skilled in the art, however, that a data record may be marked by a delete flag or other indicator in the header or in the corresponding array record 200). At 920, those blocks comprising only outdated or deleted data records are erased. At this point, a fresh determination may be carried out at 900, either in respect of all blocks in the flash memory or for the next block in the flash memory. If the blocks in the flash memory comprise not only outdated or deleted data records, then those blocks with the largest number of outdated or deleted records are identified at 925 for packing.

Figure 10:
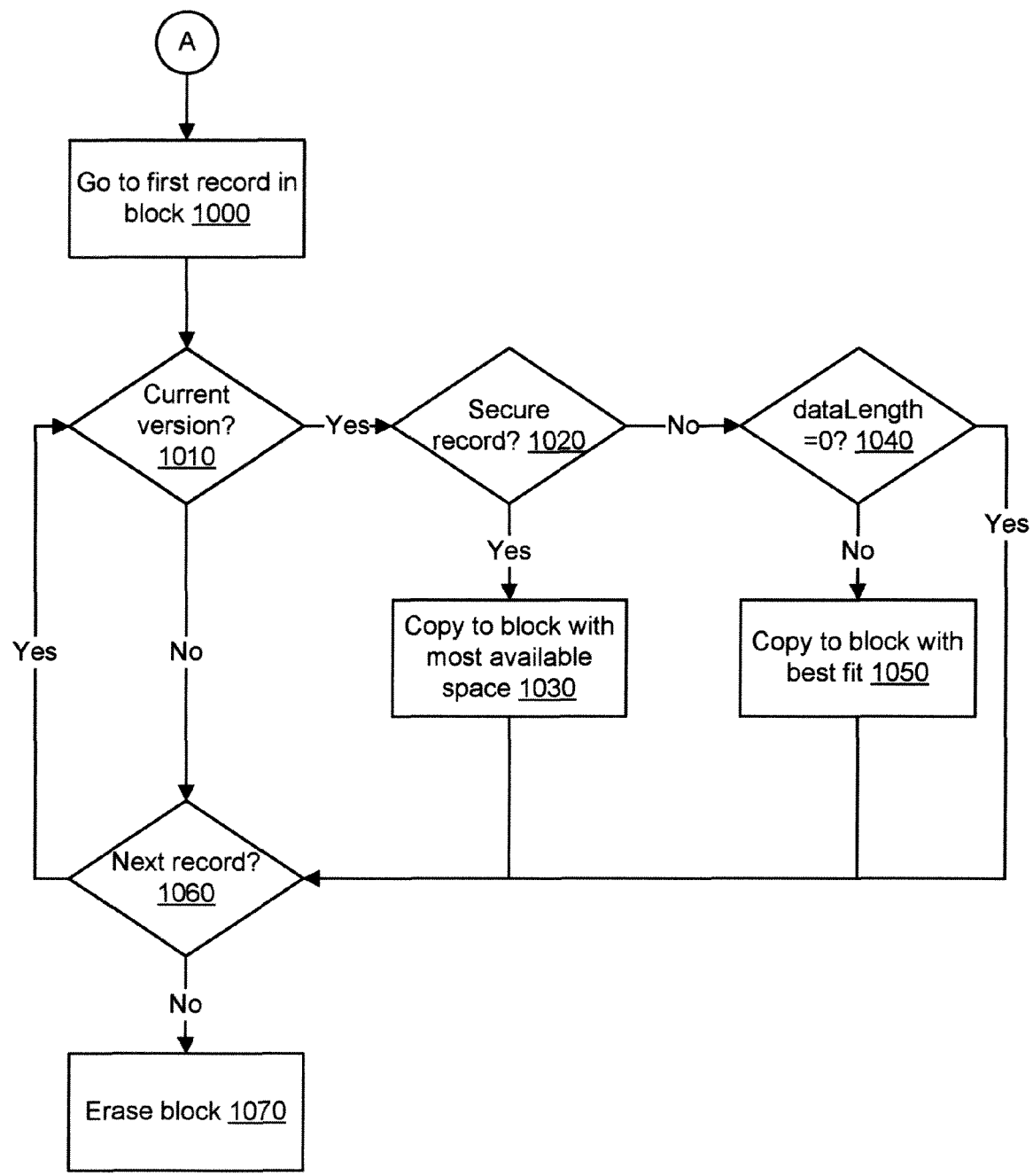
FIG. 10 is a flowchart illustrating a process for implementation in a garbage collection routine or when moving a data record within flash memory.

Turning now to FIG. 10, a single block is packed by evaluating each data record in the block to determine whether it should be moved or erased. Starting with the first data record 1000, it is determined first (with reference to the header and corresponding array record 200) whether the data record is the current version 1010. If the version number in the data record header matches the current version number stored in the corresponding array record 200, the data record is the current version. If the data record is not the current version of the record, this data record may be erased, and the process moves on to the next data record in the block as indicated by 1060.

If the data record is the current version, then it is determined whether the data record is a secure data record at 1020. If the data record is secure, it is moved to a new block according to the rules explained above (i.e., the block with the most available space) at 1030. The process then moves onto the next record 1060. If the data record is not a secure data record, it is then determined whether the data record was flagged for deletion, e.g. by having its dataLength set to zero, at 1040. If this is the case, the data record will be erased, and the process moves to 1060. If, however, the data record is not flagged for deletion (i.e., it is a current version of an unsecure data record), then it is moved to a new block with the best fit at 1050, as described above, then the process returns to 1060. As noted above, when a data record is moved as at 1030 or 1050, its version is not incremented. Once it is determined at 1060 that there are no further records in the block, the block may then be erased at 1070.

Block-packing or a more general garbage collection routine as described above may also be triggered in response to a write command, when it is determined that there is insufficient space in the flash memory to write a new or updated data record to the memory. In that case, a similar process to that described above may be implemented, where the block with the greatest amount of recoverable space is selected and packed. If as a result of this packing there is sufficient space to store the new or updated data record, the packing process is terminated and the data record is written; otherwise, the process selects the block with the now-greatest amount of recoverable space and packs this block. This process is continued until sufficient space for storing the data record has been recovered. In some circumstances, it may not be possible to recover sufficient space to store the data record due to other records stored in the memory; in that case, this process may terminate after cycling through all blocks of the flash memory twice. To ensure sufficient memory capacity to effectively pack blocks, a spare block may be reserved in the flash memory.

Figure 11:
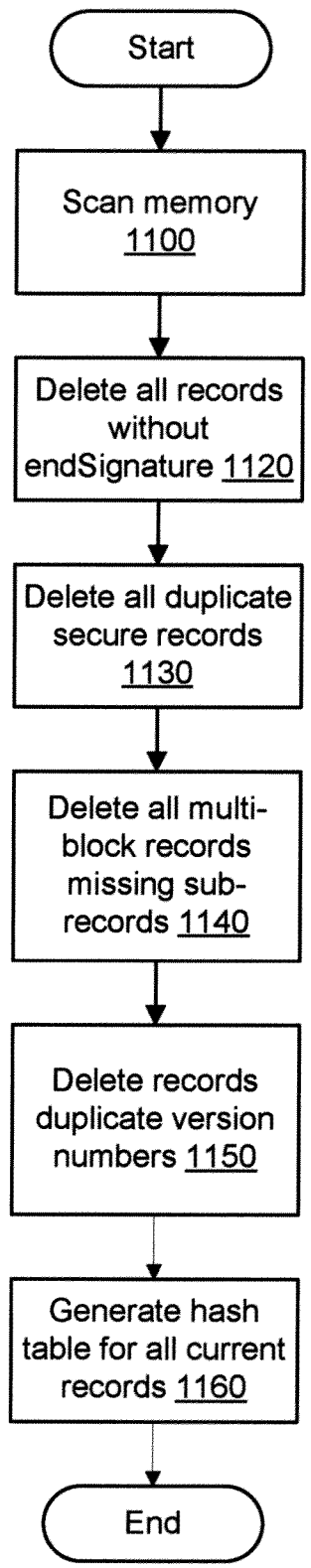
FIG. 11 illustrates an initialization routine.

The hash table or array may be constructed by the file system upon initialization, for example upon bootup or restart of the communication or computing device. During initialization, stray or invalid records may also be identified and removed. FIG. 11 illustrates a number of steps that may be carried out during an initialization process. The flash memory is scanned at 1100. Any data records found without an endSignature or an invalid endSignature may be deleted at 1120, as well as any duplicate secure data records 1130 that might remain after an incomplete updating of a secure data record. Further, any multiple-block data records that are missing one or more sub-records are deleted at 1140, as well as any records with duplicate record version numbers 1150. Once these stray records are deleted (for example in accordance with the deletion processes described above), a new hash table or array of records 200 for all remaining data records may then be generated and stored in volatile memory.

Generally, the foregoing processes provide a system and method for managing flash memory that balances security considerations (i.e., the removal of outdated secure records) with a need to improve overall performance and longevity of the flash memory by reducing the number of write/erase cycles executed in the course of writing new or updating existing data records.

Figure 12:
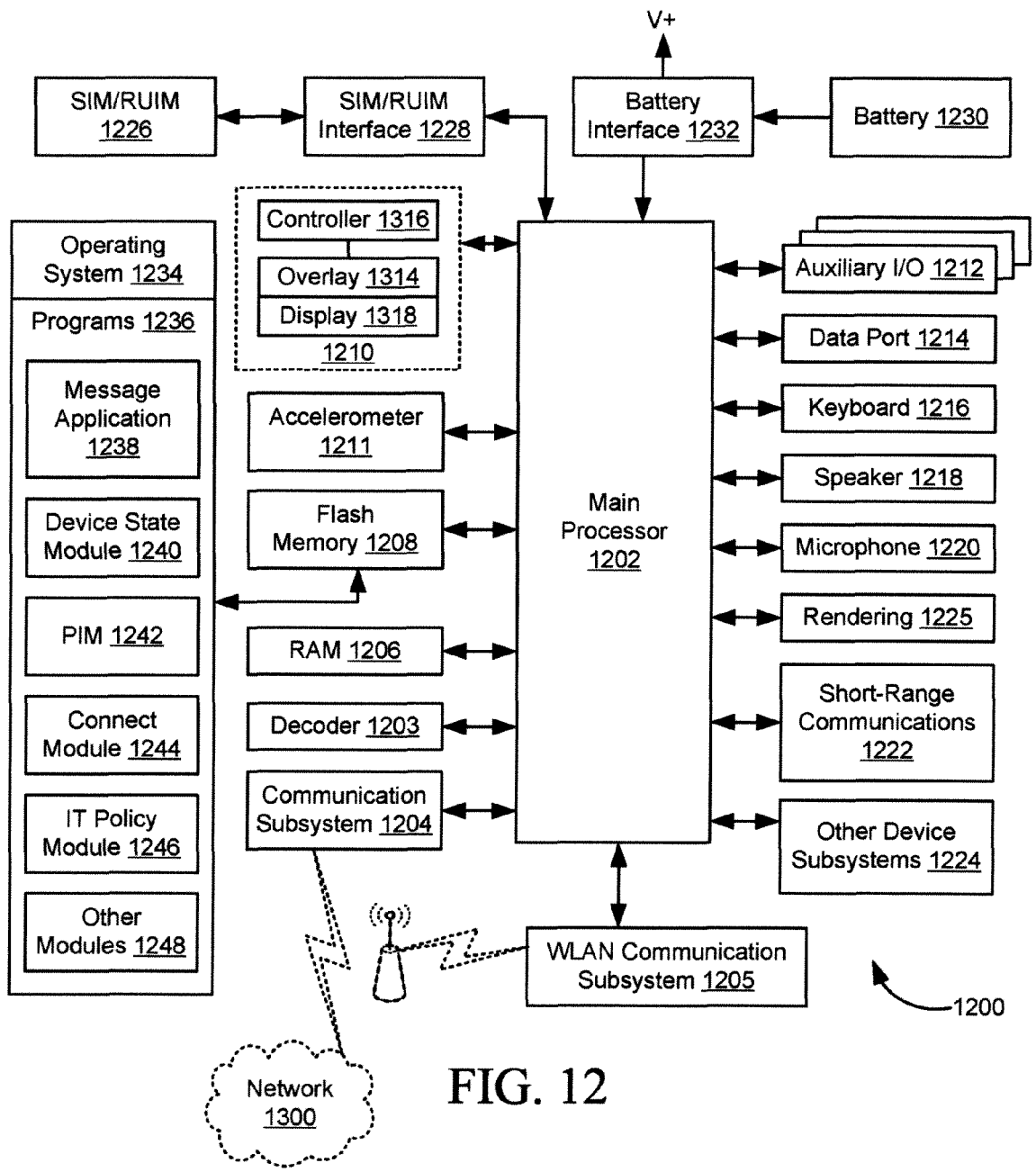
FIG. 12 is a block diagram of an embodiment of a computing or communication device for use with the embodiments of FIGS. 1 to 11.

The embodiments described herein for implementation on a computing device may be implemented on a communication device such as that illustrated in FIG. 12. The communication device may communicate with other devices over a wireless communication system. The communication device 1200 may be a mobile device with two-way communication and advanced data communication capabilities including the capability to communicate with other mobile devices or computer systems through a network of transceiver stations. The communication device 1200 can also have voice communication capabilities. However, it will be appreciated by those skilled in the art that the foregoing embodiments do not require a dual-mode communication device; it is sufficient for the device 1200 to be provisioned for data communication only via a fixed or wireless connection. Wireless connectivity may be provided by means of on-board communication hardware, such as the communication subsystems 1204, 1205 described below, or using accessories such as a wireless dongle or mobile hotspot device, not shown.

FIG. 12 is a block diagram of an exemplary embodiment of a communication device 1200. The communication device 1200 includes a number of components such as a main processor 1202 that controls the overall operation of the communication device 1200. Communication functions, including data and voice communications, are performed through a communication subsystem 1204. Data received by the communication device 1200 can be decompressed and decrypted by decoder 1203, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 1204 receives messages from and sends messages to a wireless network 1300 (FIG. 12). In this exemplary embodiment of the communication device 1200, the communication subsystem 1204 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 1204 with the wireless network 1300 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 1200 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 1200 may be provided with additional communication subsystems, such as the wireless LAN (WLAN) communication subsystem 1205 also shown in FIG. 12. The WLAN communication subsystem may operate in accordance with a known network protocol such as one or more of the 802.11™ family of standards developed by IEEE. The communication subsystem 1205 may be separate from, or integrated with, the communication subsystem 1204 or with the short-range communications module 1222. The main processor 1202 also interacts with additional subsystems such as a Random Access Memory (RAM) 1206, a flash memory 1208, a display interface 1210, other data and memory access interfaces such as an auxiliary input/output (I/O) subsystem 1212 or a data port 1214, a keyboard 1216, a speaker 1218, a microphone 1220, the short-range communications subsystems 1222 and other device subsystems 1224. The communication device may also be provided with an accelerometer 1211, which may be used to detect gravity- or motion-induced forces and their direction. Detection of such forces applied to the device 1200 may be processed to determine a response of the device 1200, such as an orientation of a graphical user interface displayed on the display interface 1210 in response to a determination of the current orientation of the device 1200.

In some embodiments, the user device 1200 may comprise a touchscreen-based device, in which the display interface 1210 is a touchscreen interface that provides both a display for communicating information and presenting graphical user interfaces, as well as an input subsystem for detecting user input that may be converted to instructions for execution by the device 1200. The touchscreen display interface 1210 may be the principal user interface provided on the device 1200, although in some embodiments, additional buttons, variously shown in the figures, or a trackpad, or other input means may be provided. In one embodiment, a transmissive TFT LCD screen 1218 is overlaid with a clear touch sensor assembly 1214 that supports single and multi-touch actions such as tap, double-tap, tap and hold, tap and drag, scroll, press, flick, and pinch. The touchscreen display interface 1210 detects these single and multi-touch actions, for example through the generation of a signal or signals in response to a touch, which may then be processed by the processor 1202 or by an additional processor or processors in the device 1200 to determine the location of the touch action, whether defined by horizontal and vertical screen position data or other position data. Touch location data may include an area of contact or a single point of contact, such as a point at or near a center of the area of contact. The touchscreen display interface 1210 may be provided with separate horizontal and vertical sensors or detectors to assist in identifying the location of a touch. A signal is provided to the controller 1216, shown in FIG. 12, in response to detection of a touch. The controller 1216 and/or the processor 1202 may detect a touch by any suitable contact member on the touch-sensitive display 1210.

Some of the subsystems of the communication device 1200 perform communication-related functions, whereas other subsystems can provide "resident" or on-device functions. By way of example, the display interface 1210 and the keyboard 1216 can be used for both communication-related functions, such as entering a text message for transmission over the network 1300 (FIG. 1), and device-resident functions such as a calculator or task list.

A rendering circuit 1225 is included in the device 1200. When a user specifies that a data file is to be viewed on the display interface 1210, the rendering circuit 1225 analyzes and processes the data file for visualization on the display interface 1210. Rendering data files originally optimized or prepared for visualization on large-screen displays on a portable electronic device display often requires additional processing prior to visualization on the small-screen portable electronic device displays. This additional processing may be accomplished by the rendering engine 1225. As will be appreciated by those of skill in the art, the rendering engine can be implemented in hardware, software, or a combination thereof, and can comprise a dedicated image processor and associated circuitry, or can be implemented within main processor 1202.

The communication device 1200 can send and receive communication signals over the wireless network 1300 after required network registration or activation procedures have been completed. Network access is associated with a subscriber or user of the communication device 1200. To identify a subscriber, the communication device 1200 requires a SIM/RUIM/UICC card 1226 (i.e. Subscriber Identity Module, Removable User Identity Module, Universal Integrated Circuit Card, or the like) or another suitable identity module to be inserted into a SIM/RUIM/UICC interface 1228 in order to communicate with a network. The SIM/RUIM/UICC card 1226 is one type of a conventional "smart card" that can be used to identify a subscriber of the communication device 1200 and to personalize the communication device 120, among other things. Without the SIM/RUIM/UICC card 1226, the communication device 1200 is not fully operational for communication with the wireless network 1300. By inserting the SIM/RUIM/UICC card 1226 into the SIM/RUIM/UICC interface 1228, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 1226 includes a processor and memory for storing information. Once the SIM/RUIM/UICC card 1226 is inserted into the SIM/RUIM/UICC interface 1228, it is coupled to the main processor 1202. In order to identify the subscriber, the SIM/RUIM/UICC card 1226 can include some user parameters such as an International Mobile Subscriber Identity (IMSI). An advantage of using the SIM/RUIM/UICC card 1226 is that a subscriber is not necessarily bound by any single physical mobile device. The SIM/RUIM/UICC card 1226 can store additional subscriber information for a mobile device as well, including datebook (or calendar) information and recent call information. Alternatively, user identification information can also be programmed into the flash memory 1208.

The communication device 1200 may be a battery-powered device including a battery interface 1232 for receiving one or more rechargeable batteries 1230. In at least some embodiments, the battery 1230 can be a smart battery with an embedded microprocessor. The battery interface 1232 is coupled to a regulator (not shown), which assists the battery 1230 in providing power V+ to the communication device 1200. Although current technology makes use of a battery, future technologies such as micro fuel cells can provide the power to the communication device 1200.

The communication device 1200 also includes an operating system 1234 and software components 1236 to 1246 which are described in more detail below. The operating system 1034 and the software components 1236 to 1246 that are executed by the main processor 1202 are typically stored in a persistent store such as the flash memory 1208, which can alternatively be a read-only memory (ROM) or similar storage element (not shown). Those skilled in the art will appreciate that portions of the operating system 1234 and the software components 1236 to 1246, such as specific device applications, or parts thereof, can be temporarily loaded into a volatile store such as the RAM 1206. Select other modules 1248 may also be included, such as those described herein.

Other software components can also be included, as is well known to those skilled in the art.

The subset of software applications 1236 that control basic device operations, including data and voice communication applications, will normally be installed on the communication device 1200 during its manufacture. Other software applications include a message application 1238 that can be any suitable software program that allows a user of the communication device 1200 to send and receive electronic messages. Various alternatives exist for the message application 1238 as is well known to those skilled in the art. Messages that have been sent or received by the user are typically stored in the flash memory 1208 of the communication device 1200 or some other suitable storage element in the communication device 1200. In at least some embodiments, some of the sent and received messages can be stored remotely from the device 1200 such as in a data store of an associated host system that the communication device 1200 communicates with.

The software applications can further include a device state module 1240, a Personal Information Manager (PIM) 1242, and other suitable modules (not shown). The device state module 1240 provides persistence, i.e. the device state module 1240 ensures that important device data is stored in persistent memory, such as the flash memory 1208, so that the data is not lost when the communication device 1200 is turned off or loses power.

The PIM 1242 includes functionality for organizing and managing data items of interest to the user, such as, but not limited to, e-mail, contacts, calendar events, voice mails, appointments, and task items. A PIM application has the ability to send and receive data items via the wireless network 1300. PIM data items can be seamlessly integrated, synchronized, and updated via the wireless network 1300 with the mobile device subscriber's corresponding data items stored and/or associated with a host computer system. This functionality creates a mirrored host computer on the communication device 1200 with respect to such items. This can be particularly advantageous when the host computer system is the mobile device subscriber's office computer system. Some or all of the data items stored at the communication device 1200 may be indexed for searching on the device 1200 either through a corresponding application, such as the PIM 1242, or another suitable module. In addition, the items may be searchable using a unified search process implemented in the device operating system 1234. For example, application data items can be encapsulated in a searchable entity class and registered with a unified search engine on the device 1200 that executes searches against all registered data repositories on the device based on received queries. The search engine can also be configured to invoke a search process of external resources, such as Internet search engines or remote databases.

The communication device 1200 also includes a connect module 1244, and an information technology (IT) policy module 1246. The connect module 1244 implements the communication protocols that are required for the communication device 1200 to communicate with the wireless infrastructure and any host system, such as a host system with which the communication device 1200 is authorized to interface.

The connect module 1244 includes a set of Application Programming Interfaces (APIs) that can be integrated with the communication device 1200 to allow the communication device 1200 to use any number of services associated with the host system or with other systems accessible over the network 1300. The connect module 1244 allows the communication device 1200 to establish an end-to-end secure, authenticated communication pipe with the host system. A subset of applications for which access is provided by the connect module 1244 can be used to pass IT policy commands from the host system to the communication device 1200. This can be done in a wireless or wired manner. These instructions can then be passed to the IT policy module 1246 to modify the configuration of the device 1200. Alternatively, in some cases, the IT policy update can also be done over a wired connection.

Other types of software applications can also be installed on the communication device 1200. These software applications can be third party applications, which are added after the manufacture of the communication device 1200. Examples of third party applications include games, calculators, utilities, etc.

The additional applications can be loaded onto the communication device 1200 through at least one of the wireless network 1300, the auxiliary I/O subsystem 1212, the data port 1214, the short-range communications subsystem 1222, or any other suitable device subsystem 1224. This flexibility in application installation increases the functionality of the communication device 1200 and can provide enhanced on-device functions, communication-related functions, or both. For example, secure communication applications can enable electronic commerce functions and other such financial transactions to be performed using the communication device 1200.

The data port 1214 enables a subscriber to set preferences through an external device or software application and extends the capabilities of the communication device 1200 by providing for information or software downloads to the communication device 1200 other than through a wireless communication network. The alternate download path can, for example, be used to load an encryption key onto the communication device 1200 through a direct and thus reliable and trusted connection to provide secure device communication. The data port 1214 can be any suitable port that enables data communication between the communication device 1200 and another computing device. The data port 1214 can be a serial or a parallel port. In some instances, the data port 1214 can be a USB port that includes data lines for data transfer and a supply line that can provide a charging current to charge the battery 1230 of the communication device 1200.

The short-range communications subsystem 1222 provides for communication between the communication device 1200 and different systems or devices, without the use of the wireless network 1300. For example, the subsystem 1222 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1204 and input to the main processor 1202. The main processor 1202 will then process the received signal for output to the display 1210 or alternatively to the auxiliary I/O subsystem 1212. A subscriber can also compose data items, such as e-mail messages, for example, using the keyboard 1216 in conjunction with the display interface 1210 and possibly the auxiliary I/O subsystem 1212. The auxiliary I/O subsystem 1212 can include devices such as: a touchscreen, mouse, track ball, infrared fingerprint detector, or a roller wheel with dynamic button pressing capability. The keyboard 1216 may be an alphanumeric keyboard and/or telephone-type keypad. However, other types of keyboards can also be used. A composed item can be transmitted over the wireless network 1300 through the communication subsystem 1204. It will be appreciated that if the display interface 1210 comprises a touchscreen, then the auxiliary I/O subsystem 1212 may still comprise one or more of the devices identified above.

For voice communications, the overall operation of the communication device 1200 is substantially similar, except that the received signals are output to the speaker 1218, and signals for transmission are generated by the microphone 1220. Alternative voice or audio I/O subsystems, such as a voice message recording subsystem, can also be implemented on the communication device 1200. Although voice or audio signal output is accomplished primarily through the speaker 1218, the display interface 1210 can also be used to provide additional information such as the identity of a calling party, duration of a voice call, or other voice call related information.

The communication subsystem 1204 component may include third party applications, which are added after the manufacture of the communication device 1200. Examples of third party applications include games, calculators, utilities, etc.

The additional applications can be loaded onto the communication device 1200 through at least one of the wireless network 1300, the auxiliary I/O subsystem 1212, the data port 1214, the short-range communications subsystem 1222, or any other suitable device subsystem 1224. This flexibility in application installation increases the functionality of the communication device 1200 and can provide enhanced on-device functions, communication-related functions, or both. For example, secure communication applications can enable electronic commerce functions and other such financial transactions to be performed using the communication device 1200.

The data port 1214 enables a subscriber to set preferences through an external device or software application and extends the capabilities of the communication device 1200 by providing for information or software downloads to the communication device 1200 other than through a wireless communication network. The alternate download path can, for example, be used to load an encryption key onto the communication device 1200 through a direct and thus reliable and trusted connection to provide secure device communication. The data port 1214 can be any suitable port that enables data communication between the communication device 1200 and another computing device. The data port 1214 can be a serial or a parallel port. In some instances, the data port 1214 can be a USB port that includes data lines for data transfer and a supply line that can provide a charging current to charge the battery 1230 of the communication device 1200.

The short-range communications subsystem 1222 provides for communication between the communication device 1200 and different systems or devices, without the use of the wireless network 1300. For example, the subsystem 1222 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1204 and input to the main processor 1202. The main processor 1202 will then process the received signal for output to the display interface 1210 or alternatively to the auxiliary I/O subsystem 1212. A subscriber can also compose data items, such as e-mail messages, for example, using the keyboard 1216 in conjunction with the display interface 1210 and possibly the auxiliary I/O subsystem 1212. The auxiliary I/O subsystem 1212 can include devices such as: a touchscreen, mouse, track ball, infrared fingerprint detector, or a roller wheel with dynamic button pressing capability. The keyboard 1216 may be an alphanumeric keyboard and/or telephone-type keypad. However, other types of keyboards can also be used. A composed item can be transmitted over the wireless network 1300 through the communication subsystem 1204. It will be appreciated that if the display interface 1210 comprises a touchscreen, then the auxiliary I/O subsystem 1212 may still comprise one or more of the devices identified above.

For voice communications, the overall operation of the communication device 1200 is substantially similar, except that the received signals are output to the speaker 1218, and signals for transmission are generated by the microphone 1220. Alternative voice or audio I/O subsystems, such as a voice message recording subsystem, can also be implemented on the communication device 1200. Although voice or audio signal output is accomplished primarily through the speaker 1218, the display interface 1210 can also be used to provide additional information such as the identity of a calling party, duration of a voice call, or other voice call related information.

The communication subsystem component 1204 may include a receiver, transmitter, and associated components such as one or more embedded or internal antenna elements, Local Oscillators (LOs), and a processing module such as a Digital Signal Processor (DSP) in communication with the receiver and transmitter.

The additional applications can be loaded onto the communication device 1200 through at least one of the wireless network 1300, the auxiliary I/O subsystem 1212, the data port 1214, the short-range communications subsystem 1222, or any other suitable device subsystem 1224. This flexibility in application installation increases the functionality of the communication device 1200 and can provide enhanced on-device functions, communication-related functions, or both. For example, secure communication applications can enable electronic commerce functions and other such financial transactions to be performed using the communication device 1200.

The data port 1214 enables a subscriber to set preferences through an external device or software application and extends the capabilities of the communication device 1200 by providing for information or software downloads to the communication device 1200 other than through a wireless communication network. The alternate download path can, for example, be used to load an encryption key onto the communication device 1200 through a direct and thus reliable and trusted connection to provide secure device communication. The data port 1214 can be any suitable port that enables data communication between the communication device 1200 and another computing device. The data port 1214 can be a serial or a parallel port. In some instances, the data port 1214 can be a USB port that includes data lines for data transfer and a supply line that can provide a charging current to charge the battery 1230 of the communication device 1200.

The short-range communications subsystem 1222 provides for communication between the communication device 1200 and different systems or devices, without the use of the wireless network 1300. For example, the subsystem 1222 can include an infrared device and associated circuits and components for short-range communication.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method of managing flash memory, the method comprising:

in flash memory comprised in a single flash memory device:

determining that a data record to be written to the flash memory is an unsecure data record;

in response to determining that the data record to be written to the flash memory is an unsecure data record:

selecting a first block of said flash memory, the first block being selected as having a best fit for said unsecure data record; and writing the unsecure data record to the first block of said flash memory; and determining that a further data record to be written to the flash memory is a secure data record;

in response to determining that the further data record to be written to the flash memory is a secure data record:

selecting a second block of said flash memory, the second block being selected as having a maximum available space for receiving the secure data record; and writing the secure data record to the second block of said flash memory.

2. The method of claim 1, wherein writing said unsecure data record comprises determining that said unsecure data record is a further version of a previous unsecure data record stored in the flash memory, and writing said unsecure data record with a record version value incremented from a record version value of said previous unsecure data record.

3. The method of claim 1, wherein writing said secure data record comprises:

determining that said secure data record is a further version of a previous secure data record stored in another block of the flash memory;

writing said secure data record with a record version value incremented from a record version value of said previous secure data record;

moving any data records comprised in said other block, other than the previous secure data record, that are not marked for deletion; and erasing said other block.

4. The method of claim 1, wherein said first block comprises a smallest amount of available space for storage of said unsecure data record for all blocks within said flash memory.

5. The method of claim 1, wherein said second block comprises a largest amount of available space for storage of said secure data record for all blocks within said flash memory.

6. The method of claim 1, further comprising deleting said unsecure data record by writing a further version of said unsecure data record to a further block being selected as having a best fit for said unsecure data record, said further version being marked for deletion.

7. The method of claim 6, wherein said further version is marked for deletion through an indication of a data length of zero.

8. The method of claim 1, wherein the flash memory comprises NAND flash memory.

9. The method of claim 1, further comprising:

for each data record in a block of a flash memory, determining whether said data record comprises a version number that is the same as an active version number stored for said data record;

if so, copying said data record to a further block of said flash memory; and erasing said block of flash memory.

10. The method of claim 1, wherein the unsecure data record comprises a record that is flagged for deletion when data comprised in the unsecured data record is superseded by new data, said record being subsequently erased during a garbage collection process; and wherein the secure data record comprises a record that is erased when data comprised in the secured data record is superseded by new data without waiting for a garbage collection process.

11. A data storage device, comprising:

flash memory comprised in a flash memory device; and a processor configured to implement the method of:

determining that a data record to be written to the flash memory is an unsecure data record;

in response to determining that the data record to be written to the flash memory is an unsecure data record:

selecting a first block of said flash memory, the first block being selected as having a best fit for said unsecure data records; and writing the unsecure data record to the first block of said flash memory; and determining that a further data record to be written to the flash memory in the same flash memory device is a secure data record;

in response to determining that the further data record is a secure data record:

selecting a second block of said flash memory, the second block being selected as having a maximum available space for receiving the secure data record; and writing the secure data record to the second block of said flash memory.

12. The data storage device of claim 11, wherein said processor is further configured to determine that said unsecure data record is a further version of a previous unsecure data record stored in the flash memory, and to write said unsecure data record with a record version value incremented from a record version value of said previous unsecure data record.

13. The data storage device of claim 11, wherein said processor is further configured to write said secure data record by:

determining that said secure data record is a further version of a previous secure data record stored in another block of the flash memory;

writing said secure data record with a record version value incremented from a record version value of said previous secure data record;

moving any data records comprised in said other block, other than the previous secure data record, that are not marked for deletion; and erasing said other block.

14. The data storage device of claim 11, wherein said first block comprises a smallest amount of available space for storage of said unsecure data record for all blocks within said flash memory.

15. The data storage device of claim 11, wherein said second block comprises a largest amount of available space for storage of said secure data record for all blocks within said flash memory.

16. The data storage device of claim 11, wherein the processor is further configured to delete said unsecure data record by writing a further version of said unsecure data record to a further block being selected as having a best fit for said unsecure data record, said further version being marked for deletion.

17. The data storage device of claim 11, wherein the flash memory comprises NAND flash memory.

18. The data storage device of claim 11, wherein the processor is further configured to:

for each data record in a block of a flash memory, determine whether said data record comprises a version number that is the same as an active version number stored for said data record;
if so, copy said data record to a further block of said flash memory; and
erasing said block of flash memory.

19. The data storage device of claim 11, wherein the unsecure data record comprises a record that is flagged for deletion when data comprised in the unsecured data record is superseded by new data, said record being subsequently erased during a garbage collection process; and wherein the secure data record comprises a record that is erased when data comprised in the secured data record is superseded by new data without waiting for a garbage collection process.

20. A computer program product comprising a non-transitory computer-readable medium storing code which, when executed by at least a processor of a data storage device, configures said data storage device to:
in flash memory comprised in a single flash memory device:
determine that a data record to be written to the flash memory is an unsecure data record;
in response to determining that the data record to be written to the flash memory is an unsecure data record:
select a first block of said flash memory, the first block being selected as having a best fit for said unsecure data records; and
write the unsecure data record to the first block of said flash memory; and
determine that a further data record to be written to the flash memory in the same flash memory device is a secure data record;
in response to determining that the further data record is a secure data record:
select a second block of said flash memory, the second block being selected as having a maximum available space for receiving the secure data record; and
write the secure data record to the second block of said flash memory.

21. The computer program product of claim 20, wherein the flash memory comprises NAND flash memory.

22. The computer program product of claim 20, wherein the unsecure data record comprises a record that is flagged for deletion when data comprised in the unsecured data record is superseded by new data, said record being subsequently erased during a garbage collection process; and wherein the secure data record comprises a record that is erased when data comprised in the secured data record is superseded by new data without waiting for a garbage collection process.

23. The computer program product of claim 20, wherein:
writing said unsecure data record comprises determining that said unsecure data record is a further version of a previous unsecure data record stored in the flash memory, and writing said unsecure data record with a record version value incremented from a record version value of said previous unsecure data record; and
writing said secure data record comprises:
determining that said secure data record is a further version of a previous secure data record stored in another block of the flash memory;
writing said secure data record with a record version value incremented from a record version value of said previous secure data record;
moving any data records comprised in said other block, other than the previous secure data record, that are not marked for deletion; and
erasing said other block.

\* \* \* \* \*